J. E. BURK.
RIM CONTRACTOR.
APPLICATION FILED SEPT. 8, 1919.

1,379,679.

Patented May 31, 1921.

WITNESSES
John C. Crawford

INVENTOR
J. E. Burk
BY L. B. James
ATTORNEY

UNITED STATES PATENT OFFICE.

JOE E. BURK, OF SAN BERNARDINO, CALIFORNIA.

RIM-CONTRACTOR.

1,379,679.

Specification of Letters Patent.  Patented May 31, 1921.

Application filed September 8, 1919. Serial No. 322,378.

*To all whom it may concern:*

Be it known that I, JOE E. BURK, a citizen of the United States, residing at San Bernardino, in the county of San Bernardino and State of California, have invented certain new and useful Improvements in Rim-Contractors, of which the following is a specification.

This invention relates generally to tire appliances, and comprehends more particularly a novel device primarily adapted for use in removing tires from the rims of motor vehicle wheels.

The primary object of the invention resides in the provision of a tool of the above stated character whereby tires may be removed from vehicle wheel rims, in an easy and expeditious manner, and one whereby novel means are employed for firmly attaching same to the rim to prevent its accidental displacement or "slipping action" when subjected to extra strain.

A further object of the invention is the provision of a device of the above stated character which is novel in construction, durable and efficient in use, and may be manufactured and sold at a minimum cost.

With the above, and other objects in view, the invention consists in the novel features, details of construction, and combination of parts which will hereinafter be more fully set forth, illustrated in the accompanying drawings, and pointed out in the appended claims.

In the accompanying drawing:—

Figure 1 is a side elevation of the tool applied for use;

Figure 3:
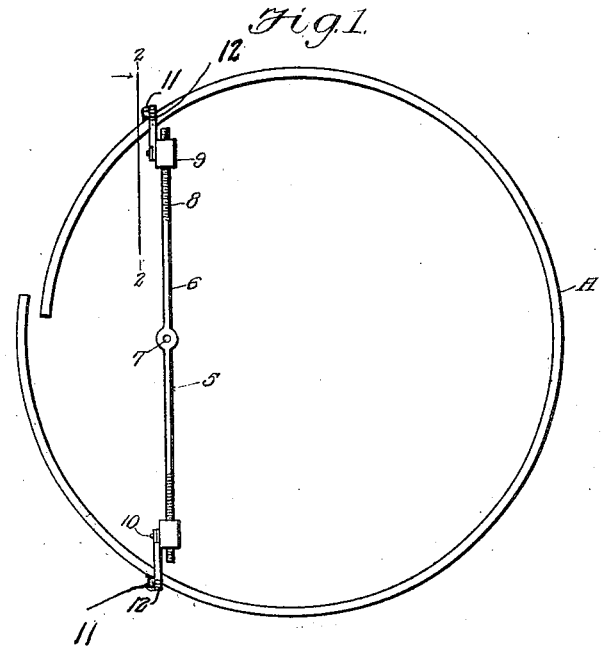
Fig. 3 is a detail perspective view of one of the rim clamps.
Figure 2:
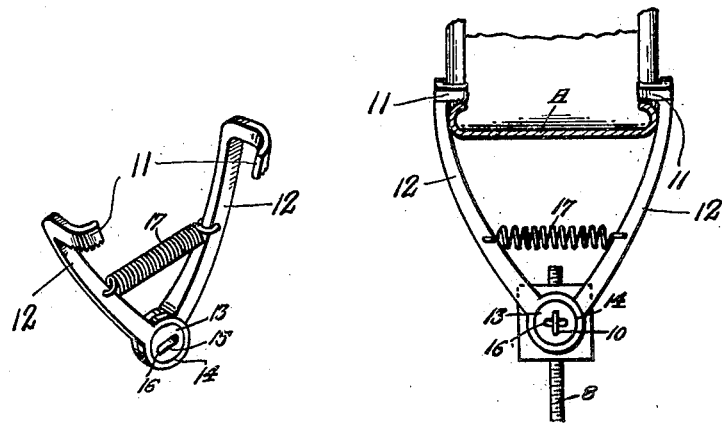
Fig. 2 is a sectional view thereof on line 2—2 of Fig. 1.

Referring more particularly to the accompanying drawing, A denotes the rim of an automobile and 5 designates the tire removing tool or rim contractor generally.

The preferred embodiment of tool here illustrated embodies an adjusting rod 6 centrally provided with an opening 7 into which may be inserted a suitable implement for imparting movement to said rod. This rod is reversely threaded as at 8 and a pair of blocks 9 of substantially rectangular form, having screw threaded bores engage said threaded parts. Each block is provided on one end thereof with a laterally projecting T-shaped stud 10. Removably carried by each stud 10, is a rim clamp 11 embodying a pair of jaws 12 pivotally connected to one another by a pivot 13 passing through suitable openings 14 provided in the inner overlapping ends of the jaws. The pivot 13 is in the form of a hollow sleeve having a centrally located cylindrical bore 15 and the wall of the bore has provided therein, a pair of diametrically disposed grooves 16. Consequently upon connecting the rim clamps with the adjusting rod, which is easily and readily accomplished by the sliding of the head of the T-shaped stud into the grooves 16, and entirely through the pivot, the rim clamps are locked on the studs by subjecting the rim clamps to a partial rotation. The active faces of the jaws of the rim clamps are serrated for establishing a firm gripping action of the jaws with the rim. Further the jaws of each rim clamp are resiliently connected through the provision of a coiled spring 17.

From the foregoing description, taken in connection with the accompanying drawing, the advantages of construction, and the method of operation will be readily apparent to those skilled in the art to which the invention relates, and while I have described the principles of operation of the invention together with the device which I now consider to be the best embodiment thereof, I desire to have it understood that the device shown is merely illustrative and that such changes may be made when desired as are within the scope of the appended claims.

Having thus described the invention what I claim as new is:—

1. A rim contractor comprising a rod having its ends reversely screw threaded, a pair of blocks having screw threaded bores engaging said ends, a sleeve pivotally and detachably connected with each block and a pair of jaw members pivotally connected together by said sleeve.

2. A rim contractor comprising a rod having its ends reversely screw threaded, a pair of blocks having screw threaded bores engaging said ends, a T-shaped pin carried by each block, a sleeve adapted to be placed over each pin and to have rotary movement thereon, the sleeve having grooves in its walls for permitting the sleeve to be placed over the T-shaped pin and a pair of jaw members pivotally connected together by said sleeve.

In testimony whereof I affix my signature.

JOE E. BURK.